United States Patent [19]

Hübinger et al.

[11] Patent Number: 6,117,972
[45] Date of Patent: Sep. 12, 2000

[54] INTRODUCING STEAM INTO POLYMER DISPERSIONS

[75] Inventors: Wolfgang Hübinger, Limburgerhof; Manfred Schulz, Mannheim, both of Germany

[73] Assignee: BASF Aktiengesellschaft, Ludwigshafen, Germany

[21] Appl. No.: 09/172,673

[22] Filed: Oct. 15, 1998

[30] Foreign Application Priority Data

Oct. 15, 1997 [DE] Germany .............................. 197 45 580

[51] Int. Cl.⁷ ...................................................... C08F 6/00
[52] U.S. Cl. ................................................................ 528/499
[58] Field of Search .............................................. 528/499

[56] References Cited

U.S. PATENT DOCUMENTS 4,224,437  9/1980  Rostock et al. ......................... 528/500
4,408,039  10/1983  Irvin ........................................ 528/500

FOREIGN PATENT DOCUMENTS 1 248 943  8/1967  Germany .
28 52 536  6/1980  Germany .

OTHER PUBLICATIONS

Verfahrenstechnik 9 (1975) Nr. 8, 379–382, Mar et al.

*Primary Examiner*—Terressa Mosley
*Attorney, Agent, or Firm*—Keil & Weinkauf

[57] ABSTRACT

A process for introducing steam into polymer dispersions or polymer solutions by introducing steam into the lower part of reaction apparatuses and deodorization apparatuses, in particular deodorization columns, which comprises introducing the steam beneath the liquid surface of the dispersion or the polymer solution.

8 Claims, No Drawings

INTRODUCING STEAM INTO POLYMER DISPERSIONS

The invention relates to a process for introducing steam into polymer dispersions or polymer solutions by introducing steam into the lower part of reaction apparatuses, deodorization apparatuses or deodorization columns.

The introduction of steam into liquids, either for heating or as a stripping medium, is frequently accompanied by a steam hammering and vibrations resulting from this. These phenomena are not only troublesome, but in the long term can also lead to damage and destruction of plant components. For controlled mixing of steam and liquid in piping, many technical solutions have therefore been developed already. One example is steam injectors which specifically swirl the steam with the liquid at high velocity and by spiral flow imparted via a slotted nozzle and thus make controlled and low-noise condensation of the steam possible.

In contrast, introducing steam directly into a product-filled vessel is a greater problem. The steam injectors used in piping have only limited success, just as is the case with jet nozzles. Either the extent of the directed flow in the vessel is not great enough to achieve uniform steam delivery and steam hammering continues to occur, or the flow is so strong that steam shoots unused through the liquid. If filling heights in the vessel vary, even exact nozzle design is no remedy.

If steam is to be introduced into sticky liquids, as, for example, in the case of polymer solutions and polymer dispersions, apparatuses of this type have contact with the backflowing product at the latest after the end of steam introduction, represent dead zones which virtually cannot be cleaned on changes of product and become fouled, in particular if the product is damaged by relatively long steam treatment and has a tendency to clumping. Adhesive dispersions are particularly critical here, but so are many other products, for example coating raw materials. With most products, product fractions which are damaged, discolored or caked by steam are prohibitive for the later application, eg. coagulate formulation in dispersions for coating paper or thermolytic breakdown products in drug and cosmetic products.

This product damage and plant fouling occurs not only in the polymerization reactors during heating of the feedstocks of the initial batch by direct steam, but also during stripping of the polymerized dispersions and solutions to remove volatile organic residues (VOCs) and solvents. The latter frequently occurs in circulating deodorization vessels (DE 12 48 943).

In circulating deodorization vessels, steam is generally introduced distributed over a plurality of injector nozzles in order to reduce the formation of large bubbles. These nozzles have a high cleaning requirement, which leads to frequent operational shutdowns. When self-crosslinking or crystallizing polymer dispersions or polymer solutions are deodorized, the steam nozzles must be cleaned extraordinarily often. Despite the distribution of the feed steam over a plurality of injector nozzles, steam hammering and occasionally severe vibrations of the vessel are observed. No solution to the problem is yet known. Similar effects occur in intensified form in a column for deodorizing polymer dispersions with steam introduction beneath the bottom-phase level. After plant operation for several years, these vibrations finally led to repeatedly occurring vibration cracks in the column jacket, in particular in the region of the suspension and at the plate internals, which led each time to plant shutdown and complex repairs. A new column was then designed in such a manner that steam was introduced above the bottom-phase level.

With this steam introduction above the bottom-phase level, the lowest sieve tray of the column became blocked within a short time due to slight superheating of the steam. This problem cannot be completely eliminated even by very good steam moistening. Therefore, after a short operating time, which could be a few hours to a few days, the column had to be shut down for a relatively long time and cleaned. Therefore, the steam feed was finally immersed in the column bottom phase. This measure reduced the cleaning interval to weeks or months, but again led to steam hammering and the necessity of cleaning the nozzles each time the steam was shut off. Furthermore, introducing the steam below the liquid surface led to turbulence in the column bottom-phase as a result of the ascending and cavitating large bubbles. It has therefore been assumed to date that in the case of relatively high steam feed flow rates, the turbulence is so great that level measurement as a precondition for the necessary control of the bottom-phase level would no longer be possible.

It is an object of the present invention to avoid the abovedescribed disadvantages of known processes and to provide a process for introducing steam into polymer dispersions and polymer solutions which, in addition to a small cleaning requirement, especially ensures long plant life with respect to avoiding vibration cracks.

With respect to decreasing the cleaning requirement, DE 28 52 536 C2 gives a reference on construction for avoiding "dead" spaces and preventing backflow of product into the gas line. This valve was only employed for introducing gas into non-sticky PVC suspensions. The glass transition point of the polymers is higher in this case than the gas-introduction temperature. In the case of PVC, this is above 80° C. Similar valve constructions, as described in DE 28 52 536 C2, are commercially available as spray valves and feed valves, eg. for cleaning apparatuses with solvents or steam.

We have found that this object is achieved by a process for introducing steam into polymer dispersions or polymer solutions by introducing steam into the lower part of reaction apparatuses and deodorization apparatuses, in particular deodorization columns, which comprises introducing the steam beneath the liquid surface of the dispersion or the polymer solution.

The object of the present invention is achieved in a surprisingly simple manner by a commercial spray valve being installed upside down, that is other than actually intended, below the liquid level of the dispersion in the vessel and the stripping steam being introduced, with a counterpressure-dependent control of the valve opening, into the vessel in such a manner that no product can flow back into the valve. The steam is introduced by at least one valve in which the steam is divided into small bubbles. In contradiction to the opinion of experts that sticky product would preferentially cake onto the hot valve surfaces, considerably longer cleaning cycles (> one year compared with, to date, at most several weeks) in comparison with the injector valves to date were found as the originally desired effect. Surprisingly, with all current operating states and products used, in a circulating deodorization vessel, after installing the spray valves, no steam hammering and vibrations occurred any longer. Whereas, in the case of low-viscosity products, the intensity of the steam hammering is markedly dependent on the operating state of the plant, with higher-viscosity dispersions and solutions (>500 mPas) particularly severe steam hammering and vibrations always occurred. Therefore, it was surprising that when steam was introduced via the spray valves, steam hammering no longer occurred at all even in the case of these products.

The specific steam load of the deodorization vessel was at least doubled by use of the spray valves in comparison with the previous injector valves. Even then, steam hammering did not occur.

In column deodorization, steam hammering has hitherto also prevented reliable bottom-phase level measurement. In new columns which have been equipped with the spray valves for below-surface steam delivery, even at a tenfold-higher gas loading in comparison with steam introduction via injector valves into circulating deodorization systems, no steam hammering and only very slight vibration occurred. Bottom-phase level measurement is possible without problems.

The gas superficial velocity of the steam introduced as stripping medium is higher than 0.8 m/s. Preferably the gas superficial velocity is 1–20 m/s, in particular 2–6 m/s.

The steam introduced condenses and the heat of condensation resulting from this heats up the contents of the apparatus, in particular of the reaction apparatus. Solvents can be separated off by the heat of condensation.

Further details and advantages of the invention can be taken from the examples given below.

COMPARATIVE EXAMPLE 1

In a vessel having a total volume of 20,200 l and a diameter of 2.4 m, which is part of a circulating deodorization system, 18 metric tonnes of an adhesive dispersion were stripped with 5 bar absolute steam at 100–300 mbar absolute via 6 nozzles (diameter 25 mm). The maximum steam rate which could be introduced was from 1000 to 1200 kg/h. At higher steam rates, the vessel and the production housing vibrated so severely that equipment damage owing to fatigue fractures was to be expected. Even at 1000 kg/h of steam, there was a very loud knocking to pounding noise resulting from the cavitating steam bubbles. The gas superficial velocity in the vessel was 0.5 m/s.

EXAMPLE 1 ACCORDING TO THE INVENTION

The vessel described in the comparative example was modified, being equipped with three steam distributor valves, that is with spray valves installed upside down, having a DN 50 steam connection. At an inlet steam rate of 1200 kg/h, no vibration occurred. The steam inlet noise was reduced to the flow noise in the valves. Steam knocking no longer occurred.

To improve and accelerate the stripping process, the steam rate was to be doubled. For this purpose, the three steam feed valves (DN 50) were replaced by two larger valves (DN 80). 2500 kg/h of steam could then be introduced into the vessel without difficulty. Neither vibrations nor steam knocking occurred. The steam superficial velocity in the vessel was 1.2–2.3 m/s. According to the opinion of experts in this area, a gas velocity of at most 0.8 m/s is permissible. However, the process ran completely in accordance with requirements even at this gas velocity which was markedly excessive according to expert opinion.

COMPARATIVE EXAMPLE 2

1200 kg/h of 5 bar steam and 60 kg/h of deionized water were introduced above the bottom-phase level in a deodorization column (d=2.3 m, 300 mbar absolute). The feed stream corresponded to a gas superficial velocity of 0.66 m/s. The walls above the bottom-phase level and the lowest column tray were significantly visibly fouled within 2 hours of column operation. This fouling would lead to shut-down and cleaning of the column within a few days. Since in another column and in circulating deodorization systems (see comparative example 1) introducing steam below the bottom-phase level led to vibration and steam hammering, the steam feed was not submerged, but moistened in excess. At three times the thermodynamically required amount of moistening water, coatings hardly occurred any longer. However, they could not be completely eliminated by this measure, so that a filter as film trap had to protect the equipment downstream of the column. Furthermore, the higher flow rate of moistening water diluted the product undesirably by about 2%. In the case of highly concentrated dispersions in particular, such a dilution is not permissible.

EXAMPLE 2 ACCORDING TO THE INVENTION 5 bar steam superheated to 180° C. was introduced at a rate of 1800 kg/h, moistened with 180 kg/h of water (corresponding to the theoretical moistening water flow rate) was introduced into a deodorization column (d=0.8 m, 400 mbar absolute) below the bottom-phase level using a steam distributor valve DN 100. This gave an unusually high gas superficial velocity of 5.7 m/s. A gravity separator designed in accordance with the principles of the art would, according to R. Marr and Franz Moser ("Die Auslegung von stehenden Gas-Flüssig-Abscheidern—Schwerkraft—and Gestrickabscheider" [Design of upright gas-liquid separators—gravity and fabric separators], Verfahrenstechnik, 9 (1975), pp. 379–382), have a diameter of 1.4 m, corresponding to a gas superficial velocity of 1.9 m/s. At the threefold higher velocities prevailing here, it was to be expected that the product forming the bottom phase would be discharged upwards. Surprisingly, however, the column could be operated very readily. Also, against expectation, the bottom-phase level control functioned well after electronic damping of the bottom-phase measurement to suppress high-frequency fluctuations in the bottom phase. Steam hammering and vibrations were not observed, unlike with previous columns. A second column (d=1.0 m, 400 mbar absolute) was equipped with two distributor valves DN 80 in the bottom dished end and 3.0 metric t/h of steam and 300 kg/h of moistening water were introduced below the bottom-phase liquid surface. This corresponds to a gas superficial velocity of 4.8 m/s. The column was operated without problems.

A further column (d=1.5 m, 300 mbar absolute) was retrofitted with three distributor valves DN 80, in order to introduce 5.0 metric t/h of steam and 500 kg/h of moistening water. The column was likewise operated without problems at a steam superficial velocity of 4.5 m/s.

Surprisingly, it was thus found that owing to the use according to the invention of the steam distributor valves below the liquid surface, the columns could be operated particularly smoothly with little vibration, and valve cleaning was not necessary within a period of, to date, 6 months.

EXAMPLE 3 ACCORDING TO THE INVENTION

To heat a charge in a polymerization vessel consisting of principally 9000 kg of water and 2000 kg of monomers and soaps from about 20° C. to about 80° C., a total of 1000 kg of steam was blown in at the bottom of the 20 metric tonne vessel below the liquid surface via a distributor valve having a DN 80 steam connection. This heated the charge within less than 20 minutes without steam hammering. Hitherto, the charge was heated via complex heating of the vessel jacket bath. The heat-up time in this case was then at least 45 min. Monomers polymerizing prematurely then led to deposit formation on the vessel wall and to frequent vessel cleaning.

We claim:

1. A process for introducing steam into a polymer dispersion or polymer solution by introducing steam into the lower part of a reaction or deodorization apparatus, which comprises introducing the steam beneath the liquid surface of the dispersion or solution in the apparatus, wherein the steam is introduced by at least one valve in which the steam is divided into small bubbles, the gas superficial velocity of the steam is higher than 0.8 m/s, and the at least one valve is a commercial spray valve which is installed upside down below the liquid surface of the dispersion or solution.

2. A process as claimed in claim 1, wherein the gas superficial velocity is 1–20 m/s.

3. A process as claimed in claim 1, wherein the steam introduced condenses and the heat of condensation resulting from this heats up the contents of the apparatus.

4. A process as claimed in claim 3, wherein solvents are separated off by the heat of condensation.

5. A process as claimed in claim 1, wherein the stripping steam is introduced with a counterpressure-dependent control of the valve in such a manner that none of the dispersion or solution can flow back into the valve.

6. A process as claimed in claim 1, wherein the gas superficial velocity is 2–6 m/s.

7. A process as claimed in claim 1, wherein the apparatus is a deodorization column.

8. A process as claimed in claim 1, wherein the apparatus is a reaction apparatus.

* * * * *